(12) United States Patent
Berzin

(10) Patent No.: US 7,848,329 B2
(45) Date of Patent: Dec. 7, 2010

(54) HANDOFFS IN HIERARCHICAL MOBILITY LABEL-BASED NETWORK

(75) Inventor: Oleg L Berzin, Huntingdon Valley, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 79 days.

(21) Appl. No.: 12/241,833

(22) Filed: Sep. 30, 2008

(65) Prior Publication Data

US 2010/0080190 A1 Apr. 1, 2010

(51) Int. Cl.
*H04L 12/28* (2006.01)
(52) U.S. Cl. ............... 370/392; 370/400; 370/401; 370/331
(58) Field of Classification Search .................. None
See application file for complete search history.

(56) References Cited

U.S. PATENT DOCUMENTS

| | | | |
|---|---|---|---|
| 2003/0043792 A1* | 3/2003 | Carpini et al. ........... 370/386 |
| 2004/0085957 A1* | 5/2004 | Verma .................... 370/389 |
| 2004/0246962 A1* | 12/2004 | Kopeikin et al. ......... 370/392 |
| 2007/0076732 A1* | 4/2007 | Kim ...................... 370/409 |
| 2008/0130571 A1* | 6/2008 | Maeda et al. ............ 370/331 |

* cited by examiner

Primary Examiner—Duc C Ho

(57) ABSTRACT

A system establishes a communication path between a mobile node and a first label edge router, registers the mobile node at the first label edge router, and creates a mobility binding at the first label edge router. The system also establishes a label switched path between the first label edge router and a second label edge router by propagating the mobility binding in the system, and establishes communication between the mobile node and a corresponding node over the label switched path. The system further maintains the communication between the mobile node and the corresponding node over the system when the mobile node moves from one physical location to another physical location and causes a handoff of the mobile node between two layer 2 grooming networks.

6 Claims, 15 Drawing Sheets

HANDOFFS IN HIERARCHICAL MOBILITY LABEL-BASED NETWORK

BACKGROUND

In a Mobile Internet Protocol (IP) network, a mobile node (MN) may enter a foreign subnet, discover a foreign agent (FA) node by listening to Internet Control Message Protocol (ICMP) messages, and register itself with the FA node and a home agent (HA) node. The FA node may include a router coupled to the subnet in which the MN is currently located, and the HA node may include a router coupled to a home subnet to which the MN is assigned.

Upon successful registration of the MN, a remote node, which intends to communicate with the MN, may forward messages to the HA node. The HA node may encapsulate and tunnel the messages to the FA node, which, in turn, may relay the messages to the MN using a layer 2 network. In the reverse direction, messages from the MN may be sent directly to the remote node.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "edge router," as used herein, may refer to a router that is placed at the edge of a network. As used herein, the term "mobility label" may refer to a Multi-Protocol Label Switched (MPLS) label that designates a mobile node or a mobile router.

Figure 1:
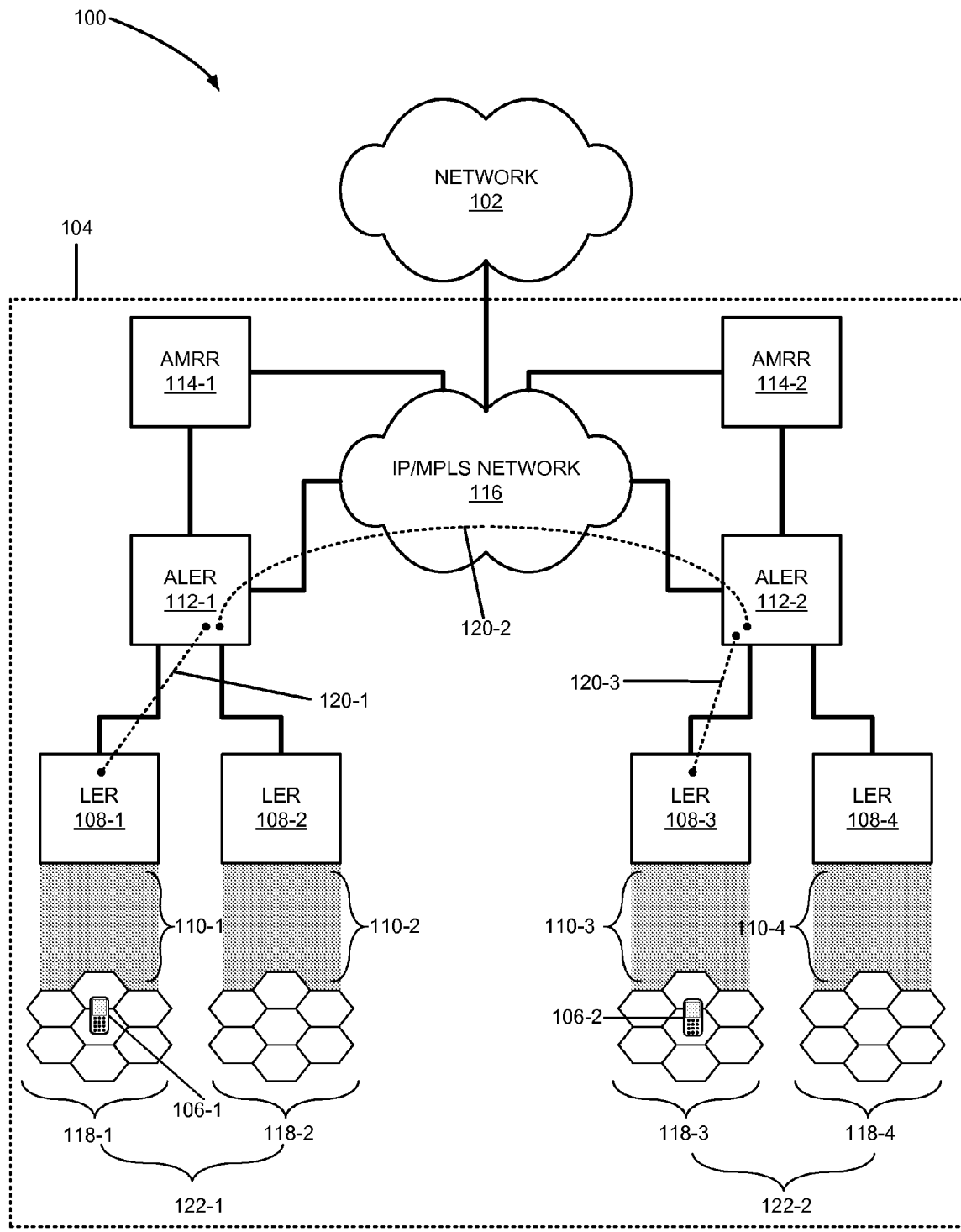
FIG. 1 is a diagram of an exemplary network in which concepts described herein may be implemented.

FIG. 1 is a diagram of an exemplary network 100 in which concepts described herein may be implemented. As shown, network 100 may include network 102 and a hierarchical mobility label-based network (MLBN) 104. Network 102 may include the Internet, an intranet, a local area network (LAN), a wide area network (WAN), a metropolitan area network (MAN), a cellular network, a public switched telephone network (PSTN), an ad hoc network, any other network, or a combination of one or more networks.

As further shown, hierarchical MLBN 104 may include mobile nodes 106-1 and 106-2 (collectively referred to herein as "mobile nodes 106" and individually as "mobile node 106-x"), label edge routers (LERs) 108-1 through 108-4 (collectively referred to herein as "LERs 108" and individually as "LER 108-x"), layer 2 (L2) grooming networks 110-1 through 110-4 (collectively referred to herein as "L2 grooming networks 110" and individually as "L2 grooming network 110-x"), area LERs (ALERs) 112-1 and 112-2 (collectively referred to herein as "ALERs 112" and individually as "ALER 112-x"), area mobility route reflectors (AMRRs) 114-1 and 114-2 (collectively referred to herein as "AMRRs 114" and individually as "AMRR 114-x"), and an Internet Protocol (IP)/multi-protocol label switched (MPLS) network 116. Depending on the implementation, hierarchical MLBN 104 may include additional, fewer, or different components than those illustrated in FIG. 1. For example, hierarchical MLBN 104 may include additional mobile nodes, L2 grooming networks, ALERs, etc.

Mobile node 106-x may include any of the following devices: a mobile router; a mobile computer; an electronic notepad or a laptop computer; a mobile telephone, such as a radio telephone; an IP phone; a personal communications system (PCS) terminal; a personal digital assistant (PDA); a pager; and/or any other type of communication device with that can participate in a wireless or wire network communication. In FIG. 1, mobile node 106-1 may communicate with mobile node 106-2 via network elements (e.g., LERs 108, ALERs 112, etc.) in hierarchical MLBN 104.

LER 108-x may include a device (e.g., an edge router, a gateway, a switch, etc.) that provides an entry to and/or an exit from hierarchical MLBN 104. LER 108-x may provide signaling and/or forwarding functions that are associated with edge routers of MPLS networks. In addition, LER 108-x may be associated with a geographical region 118-x, and may provide communication services, known as mobility support functions (MSFs), to mobile nodes 106 that are within region 118-x. For example, LER 108-1 may provide the MSFs to mobile node 106-1 while mobile node 106-1 is within region 118-1.

L2 grooming network 110-x may include one or more Radio Access Networks (RANs). L2 grooming network 110-x may aggregate signals from one or more wireless access points and may send the aggregated signals to LER 108-x. For example, L2 grooming network 110-1 may aggregate signals from wireless access points in region 118-1 and may send them to LER 108-1.

ALER 112-x may include a device (e.g., an edge router, a gateway, a switch, etc.) for performing label edge router functions on behalf of LERs 108. For example, ALER 112-1 may perform LER functions on behalf of LER 108-1 and 108-2. ALER 112-x that performs label edge routing functions for LERs 108 may be said to "aggregate" LERs 108. In FIG. 1, for example, ALER 112-2 may aggregate LER 108-3 and LER 108-4. In aggregating one or more LERs 108, ALER 112-x may perform signaling functions (e.g., exchanging routing information), forwarding functions (e.g., relay packets to/from LERs 108), and MSFs.

AMRR 114-x may include a device (e.g., a reflector) that peers with ALERs 106, LERs 108, and other AMRRs 114. AMRR 114-x may receive routing information from a peer and may distribute the routing information to other peers in network 100. When AMRR 114-x transmits the same routing information that AMRR 114-x has received, it may be said AMRR 114-x "reflects" the routing information.

In some implementations, AMRR 114-x may distribute or reflect the routing information based on demand, after an explicit request from a peer. In these implementations, AMRR 114-x may not forward packets. In other implementations, functionalities of AMRR 114-x may be incorporated in ALER 112-x. Such implementations may avoid signaling between AMRRs 114 and/or other devices, while increasing processing load on ALERs 112.

IP/MPLS network 116 may include devices and/or systems that provide routing/switching of packets based on router identifiers, known as labels, and/or IP addresses.

Regions 118-1 through 118-4 (collectively referred to herein as "regions 118" and individually referred to herein as "region 118-x") may include geographical or physical regions. Each region 118-x may include RAN cells, each of which may be associated with a particular RAN.

As shown in FIG. 1, ALER 112-x may cover a geographical area, called mobility area or simply an area, that may include a union of regions covered by LERs 108 that ALER 112 aggregates. For example, ALER 112-1 may correspond to an area 122-1, which may include regions 118-1 and 118-2, and ALER 112-2 may correspond to an area 122-2, which may include regions 118-3 and 118-4. In addition, each ALER 112-x may correspond to AMRR 114-x, which may cover the same area that corresponding ALER 112-x covers. For example, ALERs 112-1 and 112-2 may correspond to AMRRs 114-1 and 114-2, respectively. In addition, AMRRs 114-1 and 114-2 may cover areas 122-1 and 122-2, respectively. Area 122-x (e.g., area 122-1) and network devices that cover area 122-x (e.g., ALER 112-1 and AMRR 114-1) may be associated with an identifier (e.g., an area ID) that uniquely identifies area 122-x.

In FIG. 1, when mobile node 106-x moves to a particular geographical location, mobile node 106-x may perform a search for a device/router that provides MSFs, which will be described below in greater detail. If it is assumed that LER 108-x provides the MSFs and mobile node 106-x is able to locate LER 108-x, mobile node 106-x may register itself with LER 108-x.

Once the registration is complete, LER 108-x may signal routing information for mobile node 106-x to other devices in hierarchical MLBN 104 based on a routing protocol. More specifically, LERs 108 may exchange IP addresses and mobility labels associated with mobile node 106-x with ALERs 112 and AMRRs 114, which may exchange the routing information with one another. Upon completion of the signaling, mobile node 106-x may communicate with one or more mobile nodes over hierarchical MLBN 104.

Hierarchical MLBN 104 may provide scalability and efficiency in mobile communications. With ALERs 112 aggregating LERs 108 and AMRRs 114 reflecting signaling information, LERs 108 may not be fully meshed, and therefore, may not exchange as many signaling messages as, for example, some non-hierarchical networks (e.g., Mobile Internet Protocol (IP)) network), when establishing routes between mobile nodes 106.

In certain situations, LSP 120 may be updated during occurrences of handoffs. As used herein, the term "handoff" may refer to transferring an ongoing communication session from one network to another. The handoff may occur during the following circumstances: when mobile node 106-1 moves within region 118-1, when mobile node 106-1 moves from within region 118-1 to different region 118-x within the same area, or when mobile node 106-1 moves from area 122-1 to another area 122-x.

During a handoff, because each LSP 120-x may be relatively independent of other LSPs 120, when a particular LSP 120-x is modified due to the handoff, nodes involved in establishing other LSPs 120 may not need to be updated with routing/path information. This may allow hierarchical MLBN 104 to further reduce a number of signaling messages for modifying LSPs, and, therefore, may enable hierarchical MLBN 104 in being scalable and efficient.

Figure 2:
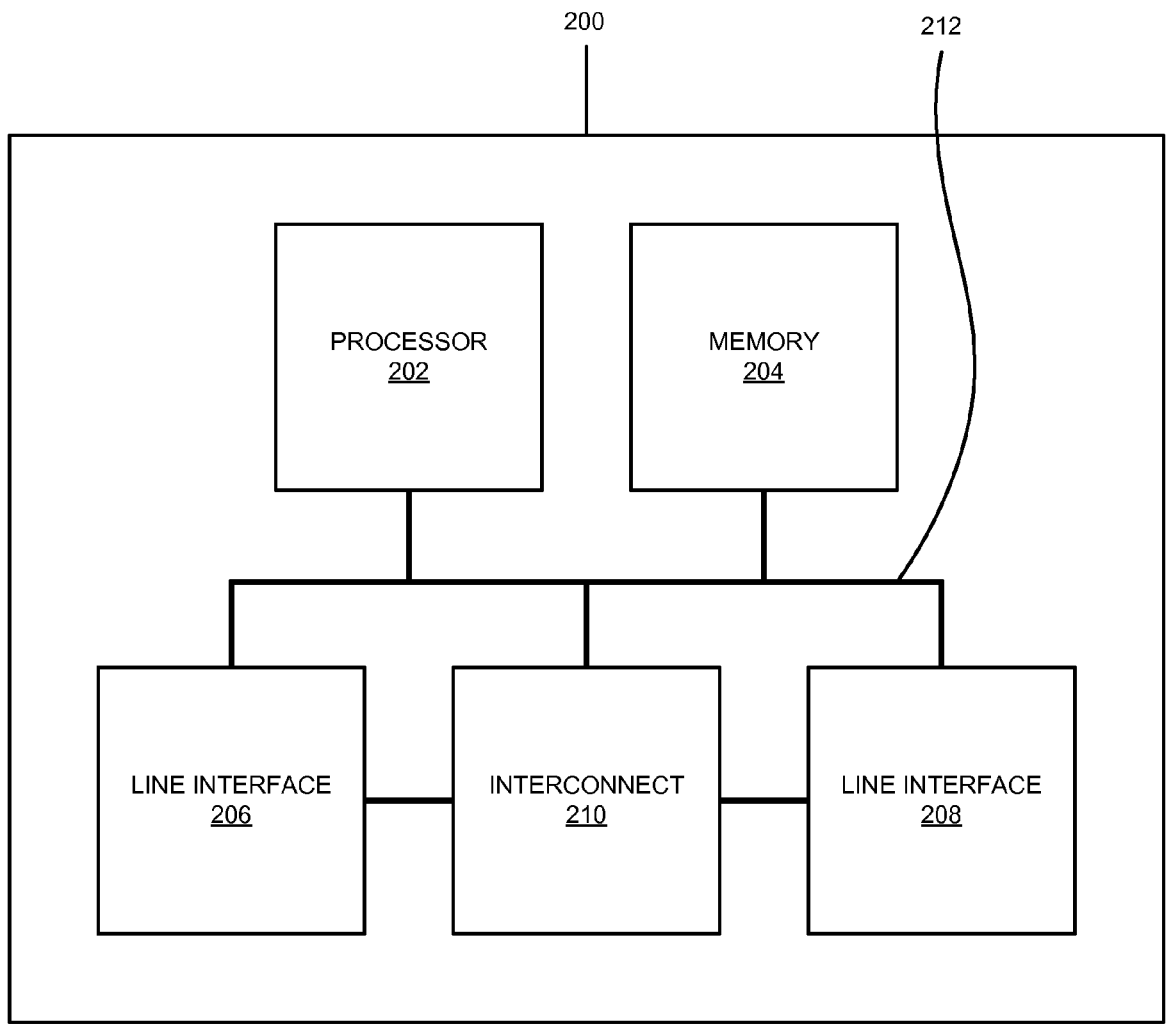
FIG. 2 is a block diagram of an exemplary network device of FIG. 1.

FIG. 2 is a block diagram of a network device 200, which may correspond to LER 108-x, ALER 112-x, and/or AMRR 114-x. As shown, network device 200 may include a processor 202, a memory 204, line interfaces 206 and 208, an interconnect 210, and communication paths 212. In different implementations, network device 200 may include additional, fewer, or different components than the ones illustrated in FIG. 2. For example, in one implementation, network device 200 may include additional line interfaces.

Processor 202 may include one or more processors, microprocessors, and/or processing logic optimized for networking and communications. Processor 202 may process packets and/or network path-related information.

Memory 204 may include static memory, such as read only memory (ROM), dynamic memory, such as random access memory (RAM), and/or onboard cache, for storing data and machine-readable instructions. In some implementations, memory 204 may also include storage devices, such as a hard disk, as well as other types of storage devices.

Line interfaces 206 and 208 may include components for receiving incoming packets from devices and/or elements in hierarchical MLBN 104 and for transmitting packets to other devices/elements in hierarchical MLBN 104. Interconnect 210 may include switches for conveying a packet from line interface 206 to line interface 208, and vice versa. Examples of interconnect 210 may include a communication bus or a switch fabric. Communication paths 212 may provide an interface through which components of network device 200 can communicate with one another.

Figure 3:
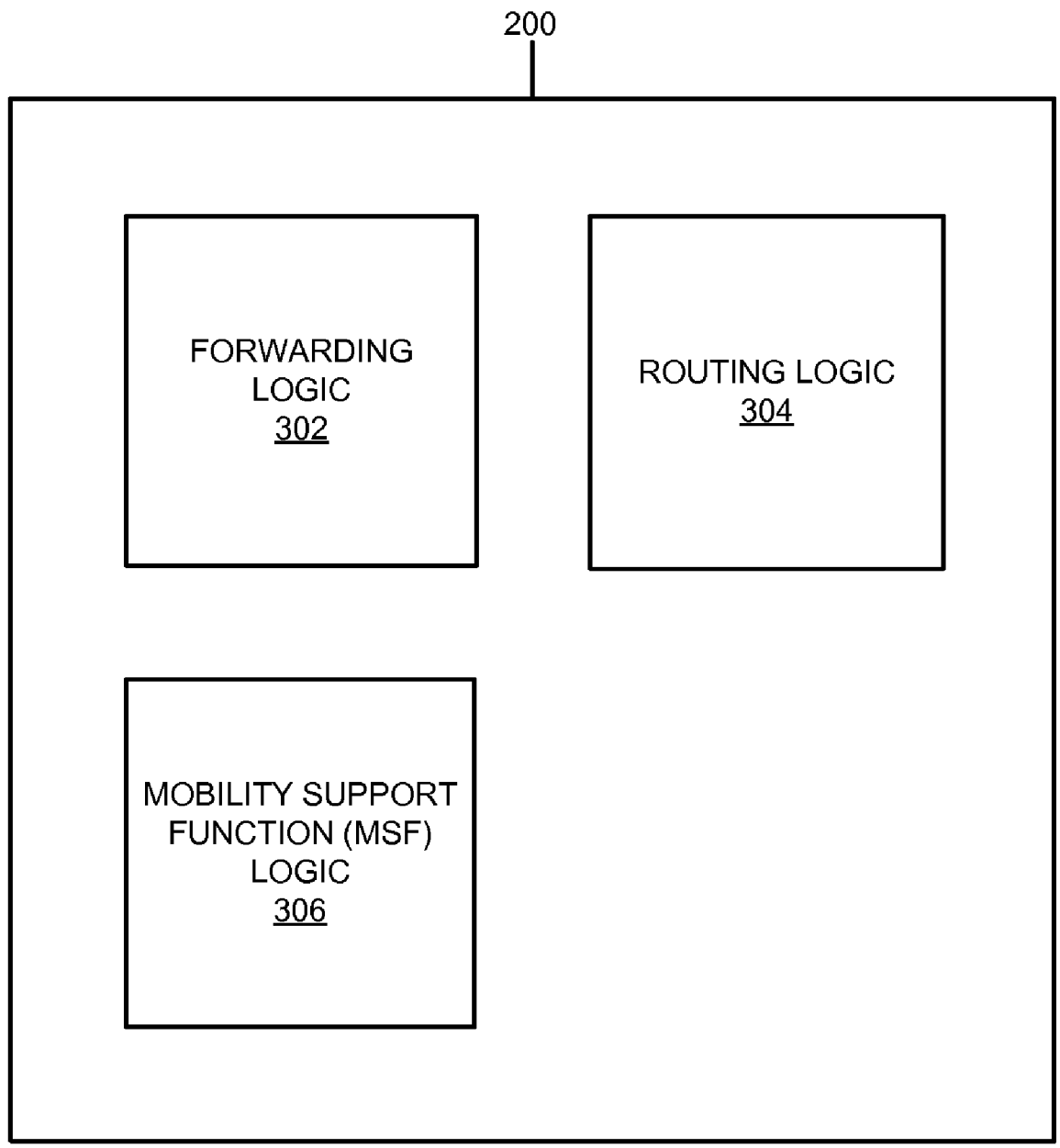
FIG. 3 is a functional block diagram of the exemplary network device of FIG. 2.

FIG. 3 is a functional block diagram of exemplary network device 200. As shown, network device 200 may include forwarding logic 302, routing logic 304, and Mobility Support Function (MSF) logic 306. Depending on the implementation, network device 200 may include fewer, additional, or different functional components than those illustrated in FIG. 3. For example, if network device 200 is implemented as AMRR 114-x, network device 200 may not necessarily include forwarding logic 302.

Forwarding logic 302 may include hardware and/or software for routing packets toward their destination devices over hierarchical MLBN 104. In hierarchical MLBN 104, a network route that a packet follows as the result of being forwarded by forwarding logic 302 in various routers may be referred to as a label switched path (LSP). To route a packet along the LSP, forwarding logic 302 may direct a packet to a proper output port on a line interface of network device 200 based on the packer header.

In addition to forwarding the packet, forwarding logic 302 may perform various procedures on the packet header, depending on whether its host router is implemented as LER 108-x, ALER 112-x, and/or a label switched router (LSR) (not shown). If the host router is implemented as LER 108-x, forwarding logic 302 may convert a packet that enters hierarchical MLBN 104 into a MPLS packet, by adding a MPLS header to the packet and/or a MPLS label (e.g., a mobility label) that identifies the mobile node registered at originating LER 108-x. Conversely, forwarding logic 302 may convert a MPLS packet that exits hierarchical MLBN network 106 by stripping away its MPLS header, including both the outer label and the mobility label.

If the host router operates as a LSR or ALER 112-x, forwarding logic 302 may perform an operation on the MPLS header (e.g., a mobility label) of a received packet. The operation may include creating another MPLS label and inserting it next to the original MPLS label, swapping the MPLS label for another MPLS label, and/or removing the MPLS label and/or the MPLS header. Because an outermost MPLS label in the MPLS header may designate the next-hop router, an operation that affects the label may also modify the identity of the next-hop router and the LSP.

Routing logic 304 may include hardware and/or software for communicating with other routers to gather and store routing information. Routing logic 304 may enforce a specific set of procedures for communicating routing messages (e.g., label distribution protocol (LDP) messages, constraint-based routing LDP messages, Multi-Protocol (MP)-Border Gateway Protocol (BGP) messages, etc.). Through the exchange of the routing messages, network device 200 may manage routing information.

In managing the routing information, routing logic 304 may provide a function that may include an inter-domain control plane that overlays a MPLS control plane of hierarchical MLBN 104. The inter-domain control plane may be responsible for the inter-domain network distribution and/or withdrawal of MPLS labels (e.g., mobility labels) that are assigned to mobile nodes. The distribution of MPLS labels may establish/remove a network route/path (e.g., LSP) within hierarchical MLBN 104.

In providing the inter-domain control plane functions, routing logic 304 may employ an inter-domain routing/signaling protocol to exchange messages with other devices, such as LER 108-x, ALER 112-x, and AMRR 114-x. For example, routine logic 304 may use MP-BGP to propagate mobility labels from AMRR 114-x to other AMRRs 114.

MSF logic 306 may include hardware and/or software for supporting mobile node 106-x. MSF logic 306 may permit network device 200 (e.g., mobile node 106-x) to discover another device (e.g., another network device 200) that includes MSF logic 306 and to register mobile node 106-x at the other device. Mobile node 106-x may initiate the discovery by sending a layer 2 multicast discovery signal or a solicitation message. Upon discovery of another network device 200 with MSF logic 306, mobile node 106-x may register itself at another network device 200, by sending a series of messages to another network device 200. The messages may convey various networking parameters, such as an identifier for mobile node 106-x, an IP address, a priority level of transport service, a an area ID, etc.

MSF logic 306 may associate/de-associate an IP address or a prefix of mobile node 106-x with a mobility label. For example, MSF logic 306 may associate and de-associate (e.g., bind/unbind) a mobility label with an identifier of a line interface (e.g., line interface 208) via which packets from mobile node 106-1 are received, an IP address of mobile node 106-1, and/or a prefix for a range of IP addresses of mobile node 106-x. The association may include, in addition to layer 3 information (e.g., IP address), information that may be specific to layer 2 (e.g., layer 2 header information).

MSF logic 306 may participate in propagating routing information for mobile node 106-x across inter-domain routers. In one implementation, MSF logic 306 may employ routing logic 304, which in turn, may employ MP-BGP to propagate the routing information.

In the above, network device 200 may exchange and manage, via routing logic 304 and MSF logic 306, the routing information for mobile nodes 106. Network device 200 may store the routing information for mobile nodes in a forwarding information base (FIB).

Figure 4:
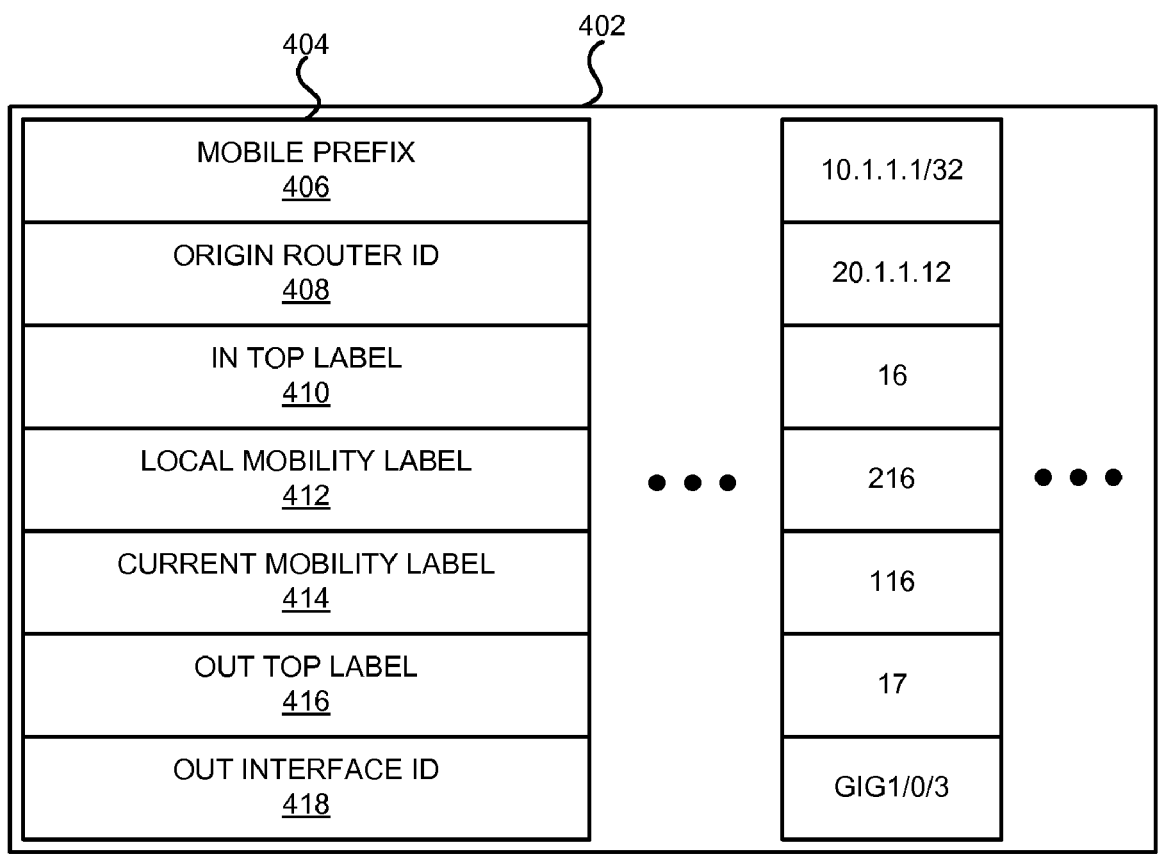
FIG. 4 shows a diagram of an exemplary forwarding information base (FIB) of the network device of FIG. 3.

FIG. 4 illustrates a diagram of an exemplary FIB 402 that may be included in and/or managed by network device 200 (e.g., in memory 204). FIB 402 may include one or more FIB records, one of which is shown in FIG. 4 as FIB record 404. When a packet arrives at network device 200 (e.g., ALER 112-x), network device 200 may retrieve FIB record 404 by matching one or more fields in FIB record 404 to part of the packet's MPLS header. Furthermore, network device 200 may use information provided in retrieved FIB record 404 to forward the packet.

As shown in FIG. 4, FIB record 404 may include a Mobile Prefix field 406, an Origin Router Identifier (ID) field 408, an In Top Label field 410, a Local Mobility Label field 412, a Current Mobility Label field 414, an Out Top Label field 416, and an Out Interface field 418. Depending on the implementation, FIB record 404 may include fewer, additional, or different fields than the ones illustrated in FIG. 4.

Mobile Prefix field 406 may include an address prefix (e.g., "10.1.1.1/32") that may be associated with a forwarding equivalency class (FEC). When a packet arrives at network device 200 and the packet belongs to the FEC specified by Mobile Prefix field 406 in FIB record 404, network device 200 may forward the packet in accordance with FIB record 404, as further described below.

Origin Router ID field 408 may include an identifier that is associated with an edge router from which the packet may have been sent. For example, Origin Router ID field 408 may include a value (e.g., "20.1.1.12") that provides an address of an edge router from which the mobility binding update for the mobile prefix in question may have been sent.

In Top Label field 410 may include a top or outermost MPLS label of the packet. For example, In Top Label field 410 may include a value (e.g., "16") associated with a top or outermost MPLS label of the packet.

Local Mobility Label field 412 may include a mobility label. For example, Local Mobility Label field 412 may include a value (e.g., "216") associated with a mobility label. To retrieve FIB record 404 in FIB 402, network device 200 may match a mobility label in the packet to the value of Local Mobility Label field 412.

Current Mobility Label field 414 may include a mobility label that may replace the mobility label on the packet when the packet enters a new LSP at network device 200. For example, Current Mobility Label field 414 may include a value (e.g., "116") associated with the replacement mobility label. Typically, a mobility label on a packet may be swapped in place of another mobility label when the packet enters or exits a LSP, such as LSP 120-1, LSP 120-2, or LSP 120-3, at an edge router (e.g., LER 108-1, ALER 112-1, etc.) at the start or the end of the LSP.

Out Top Label field 416 may include a label that may be swapped in place of the top label of the packet by forwarding logic 302. For example, Out Top Label field 416 may include a value (e.g., "17") associated with the swapped label.

Out Interface field 418 may include a name of line interface via which the packet may leave network device 200. For example, Out Interface field 418 may include a value (e.g., "GIG1/0/3") that provides an address of the line interface.

In FIB record 404, In Top Label field 410 and Out Top Label field 416 may contain MPLS labels that may be associated with routers (e.g., LER 108, ALER 112, etc.). Local Mobility Label field 412 and Current Mobility Label field 414 may contain mobility labels that may have been used in signaling route information for mobile nodes 106 and for forwarding packets to/from mobile nodes 106.

The above paragraphs describe system elements that may be related to devices and/or components in hierarchical MLBN 104. FIGS. 5A through 13B show or illustrate exemplary processes that may be performed by one or more of these devices and/or components. The processes may pertain to modifying and/or updating LSP 120 and sending packets over the modified/updated LSP 120.

Figure 5A:
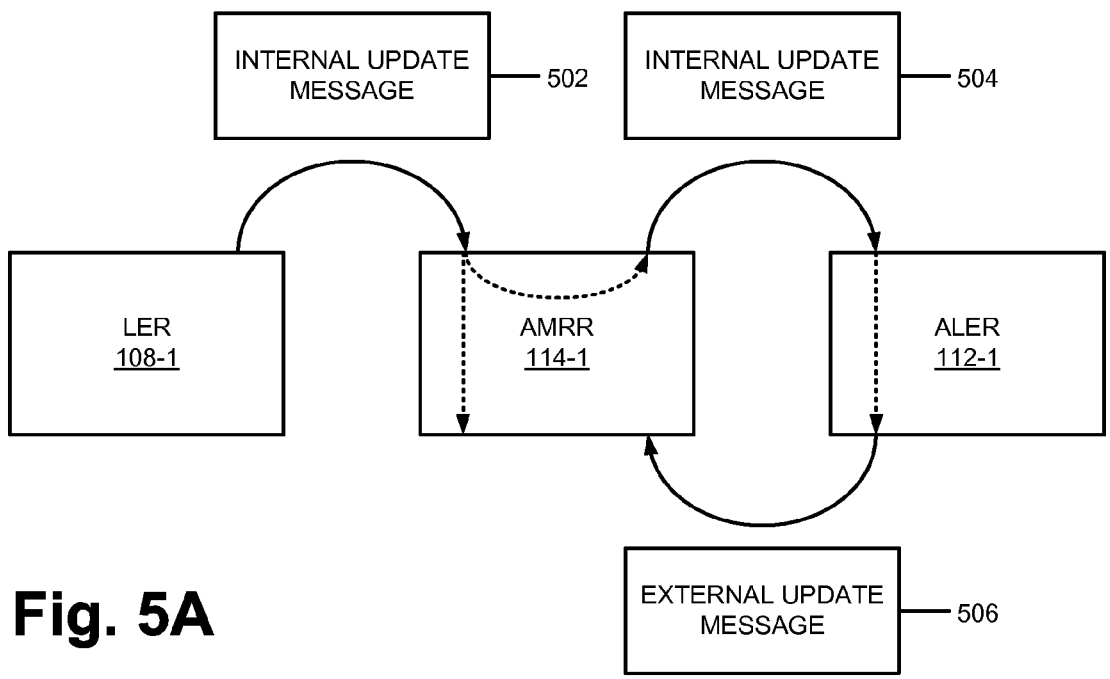
FIGS. 5A and 5B illustrate an internal update process and an external update process.
Figure 5B:
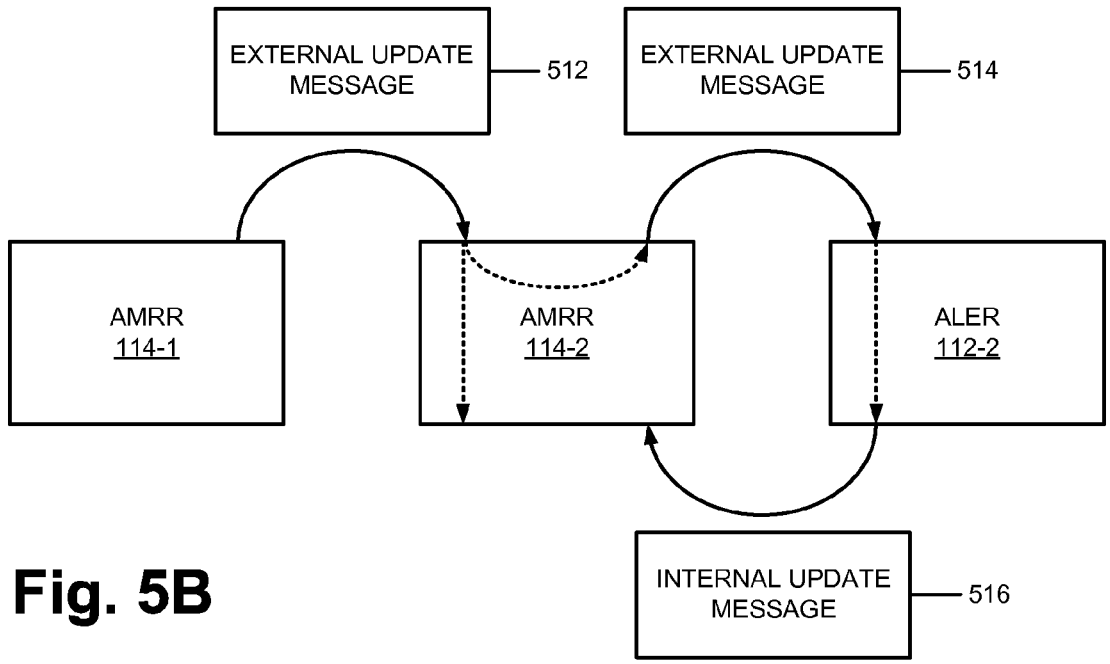

FIGS. 5A and 5B illustrate exemplary processes, also referred to herein as an "internal update" process and an "external update" process. As explained below, the internal update process and the external update process may be performed within the exemplary processes in FIGS. 6, 7, and/or 8. The internal and external update processes may occur when device 200 initiates updates in routing information at network devices of hierarchical MLBN 104. The updates may be necessary to establish a LSP, and accommodate route changes that occur as a result of handing-off mobile node 106-x between different RANs or as a result of terminating a communication session between mobile nodes 106.

As shown in FIG. 5A, LER 108-1 may initiate an internal update process by sending an internal update message 502 to AMRR 114-1. Internal update message 502 may include a mobility binding (e.g., an association between a mobility label and mobile node 106-x, a router ID of LER 108-x, an area ID, etc.). Upon receiving internal update message 502, AMRR 114-1 may perform updates to its routing information base and may issue an internal update message 504 to ALER 112-1. Internal update message 504 may include the same or similar information as internal update message 502.

In response to internal update message 504, ALER 112-1 may update its routing/forwarding information base (e.g., FIB 402), and may send an external update message 506 to AMRR 114-1. External update message 506 may include an identifier for ALER 112-1 and a mobility label, known as a Local Mobility Label. To devices that cover regions/areas outside area 122-1, the Local Mobility Label may operate as a proxy label that represents the original mobility label in area 122-1. For example, assume that a mobility label for mobile node 106-1 is "24." If Local Mobility Label is "36" at AMRR 114-1, Local Mobility Label "36" may serve as a proxy for label "24" to AMRR 114-2 or ALER 112-2.

FIG. 5B illustrates an external update process. As illustrated, external update process may begin with AMRR 114-1 issuing an external update message 512 to other AMRRs, such as AMRR 114-2. External update message 512 may include a mobility binding created by ALER 112-1. The mobility binding, in turn, may include information that is local to ALER 112-1, such as a router ID of ALER 112-1 (e.g., ALER 112-x that initiated the external update) and a mobility label (e.g., a Local Mobility Label) that ALER 112-1 assigned to mobile node 106-1.

Upon receiving external update message 512, AMRR 114-2 may provide the mobility binding included in the external update message 512 to ALER 112-2, via an external update message 514. External update message 514 may include the same or similar information as external update message 512.

In response to external update message 514, ALER 112-2 may update its routing/forwarding information base (e.g., FIB 402), and may send an internal update message 516 to AMRR 114-2. Internal update message 516 may include an identifier for ALER 112-2 and a Local Mobility Label.

In FIG. 5A, the internal update process is illustrated as starting at LER 108-1 and propagating to AMRR 114-1 and then to ALER 112-1. In general, an internal update process which starts at a LER for a given region may propagate to an AMRR and ALER that cover an area including the region. Similarly, in FIG. 5B, the external update process is illustrated as starting at AMRR 114-1 and propagating to AMRR 114-2 and ALER 112-2. In general, an external update process which starts at an AMRR for an area may propagate to other AMRRs and ALERs that do not cover the area.

The internal and/or external updates may occur when devices in hierarchical MLBN 104 establish LSP 120 and/or update LSP 120. In certain situations, LSP 120 may be updated during occurrences of handoffs. In hierarchical MLBN 104, a handoff may occur during the following circumstances: when mobile node 106-1 moves within region 118-1, when mobile node 106-1 moves from within region 118-1 to different region 118-x within the same area, or when mobile node 106-1 moves from area 122-1 to another area 122-x. FIGS. 6-11 show or illustrate exemplary processes for updating LSP 120 when a handoff occurs during each of the above circumstances.

Figure 6:
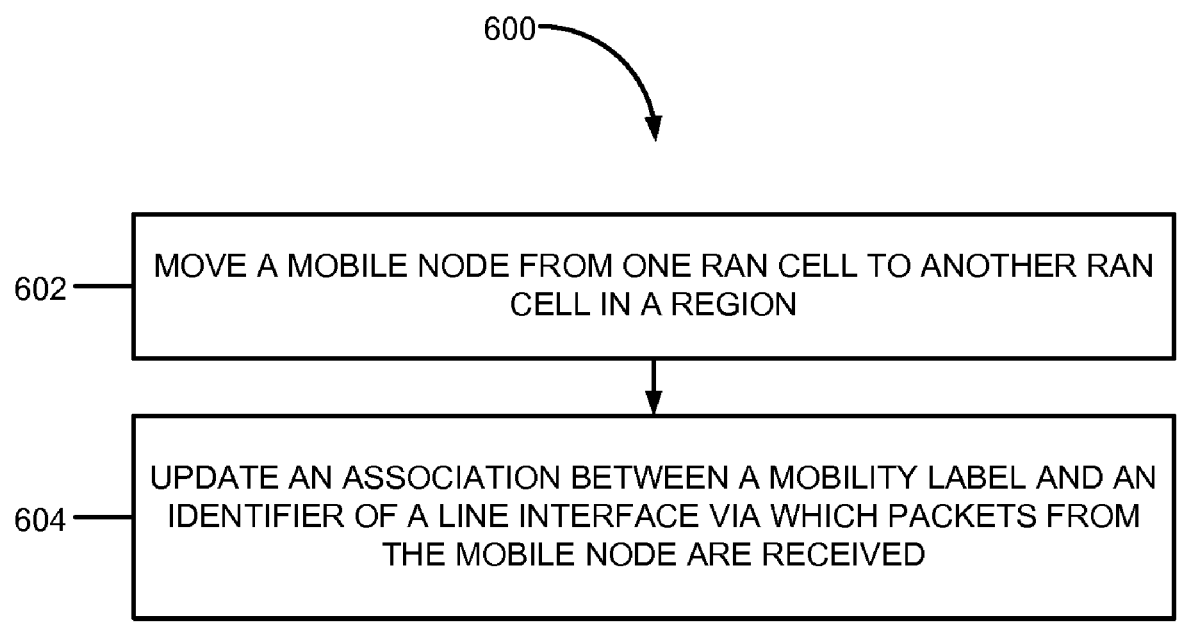
FIG. 6 is a flow diagram of an exemplary process for updating devices in a label switched path (LSP) of FIG. 1 when an exemplary mobile node of FIG. 1 moves from within a radio access network (RAN) cell to another RAN cell in a region.

FIG. 6 is a flow diagram of an exemplary process 600 for updating devices in LSP 120 when mobile node 106-1 moves from within a RAN cell in region 118-1 to another RAN cell in region 118-1. The updates may provide for traffic continuity during a handoff of mobile node 106-1 from a RAN to another RAN during the movement.

Figure 7:
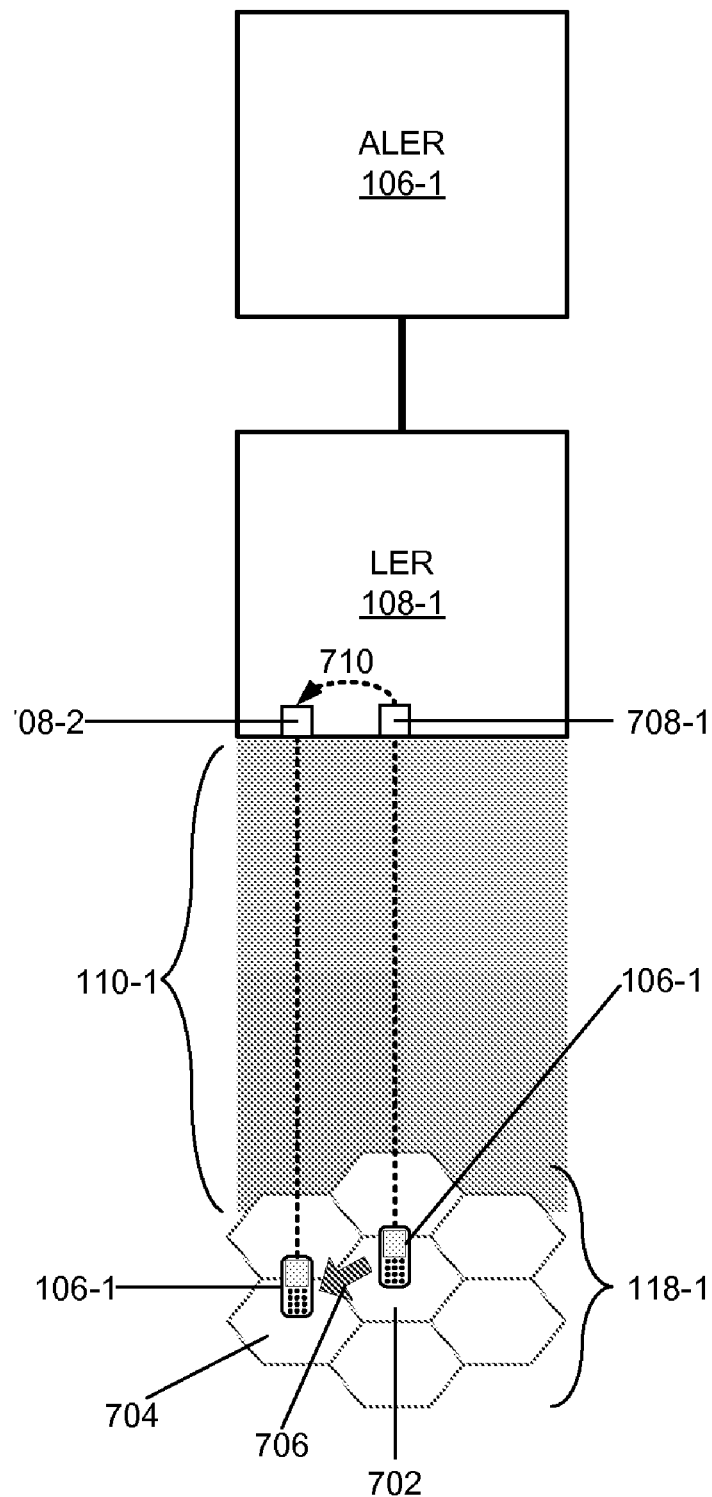
FIG. 7 illustrates the mobile node of FIG. 1 communicating with a label edge router (LER) of FIG. 1 before and after a handoff.

Process 600 may begin with moving a mobile node from a RAN cell within a region to another RAN cell within a region (block 602). As shown in FIG. 7, mobile node 106-1 may move from one RAN cell to another RAN cell. Mobile node 106-1 may be within a RAN cell 702 at one moment. In the next moment, mobile node 106-1 may move to within a RAN cell 704, as indicated by an arrow 706. When mobile node 106-1 moves from RAN cell 702 to RAN cell 704, a RAN in L2 grooming network 110-1 may complete a radio handoff of mobile node 106-1 to another RAN L2 grooming network.

An association between a mobility label and an identifier of a line interface, via which packets from the mobile node are received, may be updated (block 604). After the radio handoff, MSF logic 306 in LER 108-1 may complete the handoff by looking up an association between the mobility label, a line interface ID, and an IP address (see description of MSF logic 306), and by updating the association with an identifier of the line interface via which the packets arrive after the handoff. Alternatively, MSF logic 306 may update the association based on keep-alive messages from mobile node 106-1. If mobile node 106-1 moves into a RAN cell with different layer 2 characteristics from the original RAN cell before the handoff, MSF logic 306 may update the association with new layer 2 information.

FIG. 7 illustrates mobile node 106-1 communicating with LER 108-1 before and after the handoff. As shown, before the hand-off, mobile node 106-1 may communicate with LER 108-1 via a line interface 708-1. After the handoff, mobile node 106-1 may communicate with LER 108-1 via line interface 708-2. The switch from line interface 708-1 to line interface 708-2 is indicated by arrow 710.

After the handoff, mobile node 106-1 may continue to send packets that are addressed to mobile node 106-2 to LER 108-1. If there are no such packets to send, mobile node 106-1 may send keep-alive messages to LER 108-1's virtual link layer address (see description of block 602). The keep-alive messages may carry the area ID of area 122-1. Once the LER 108-1 updates information for mobile node 106-1, packets that are sent from mobile node 106-2 to mobile node 106-1 may follow LSP 120.

In some implementations, to maintain traffic continuity between mobile node 106-1 and mobile node 106-2 during the handoff, packets for mobile node 106-1 may be duplicated at LER 108-1 and may be sent via two line interfaces on LER 108-1. In such a case, LER 108-1 may temporarily maintain a registration record with two layer 3 interface IDs until no activity is detected on either one of the layer 3 interfaces.

Figure 8:
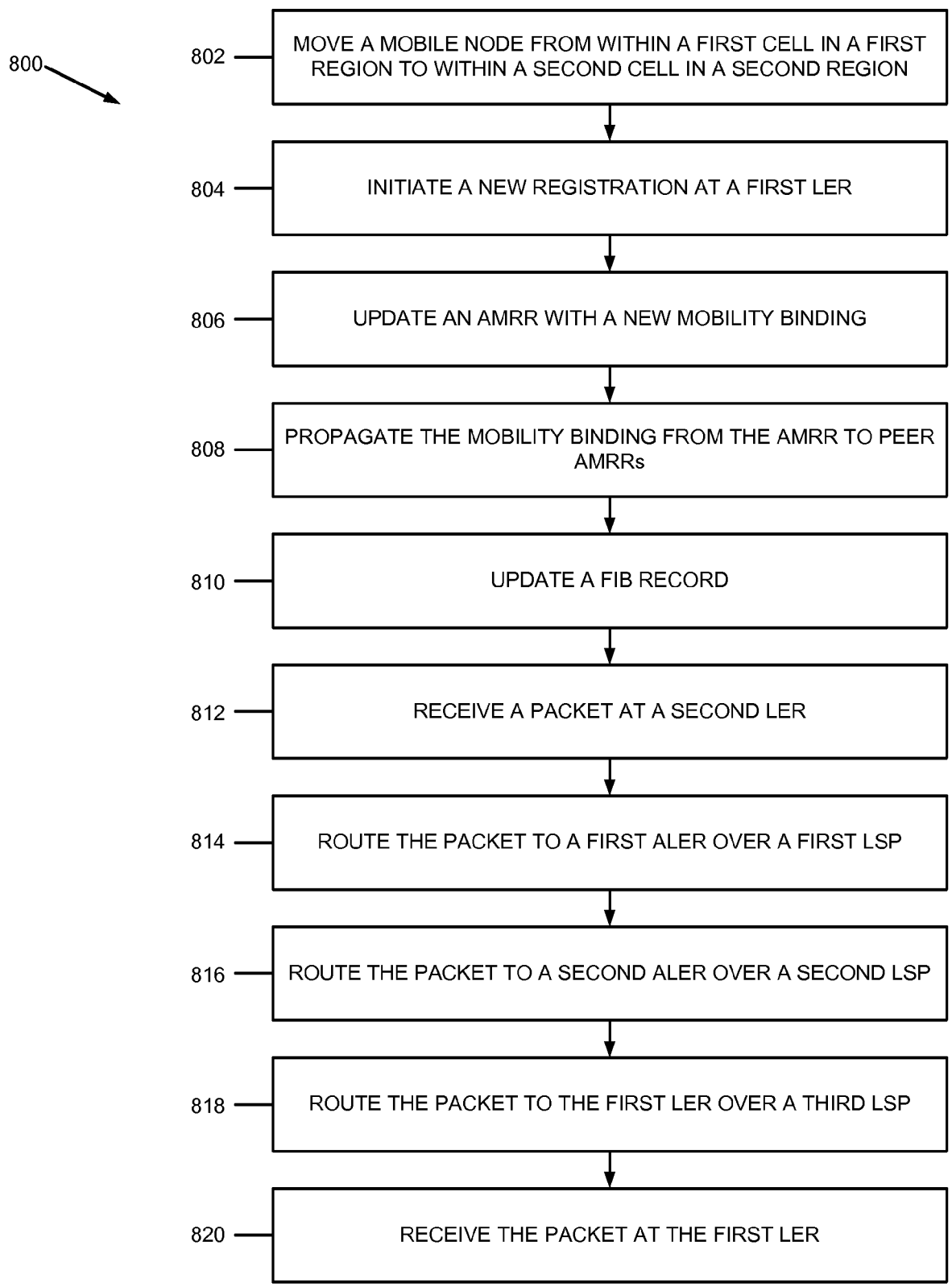
FIG. 8 is a flow diagram of an exemplary process for updating the LSP of FIG. 1 when the mobile node of FIG. 1 moves from within a region to another region.

FIG. 8 is a flow diagram of an exemplary process 800 for updating LSP 120 when mobile node 106-1 moves from within region 118-1 to within region 118-2 in area 122-1. It may be assumed that mobile node 106-1 is communicating with mobile node 106-2.

Figure 9:
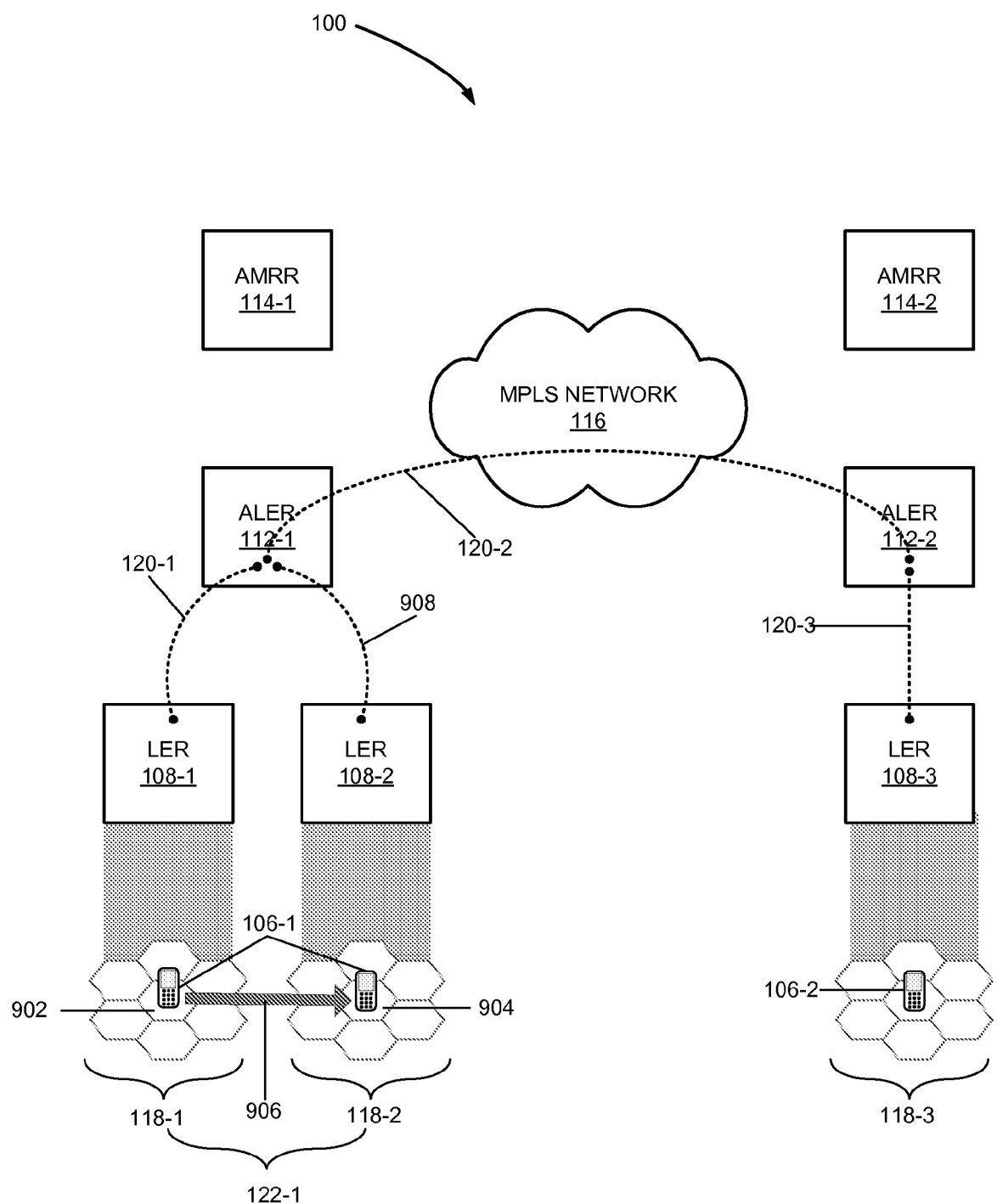
FIG. 9 illustrates the mobile node of FIG. 1 moving from within one region to within another region in an area.

Process 800 may begin with moving a mobile node from within a first RAN cell in a first region to within a second RAN cell in a second region (block 802). As shown in FIG. 9, mobile node 106-1 may move from within region 118-1 to within region 118-2 in area 122-1. Mobile node 106-1 may be within RAN cell 902 before mobile node 106-1 moves. Mobile node 106-1 may then move to within RAN cell 904, as indicated by an arrow 906.

A new registration may be initiated at a first LER (block 804). Upon arriving in region 118-2, mobile node 106-1 may discover LER 108-2, and may register itself with MSF logic 306 in LER 108-2. During the registration, LER 108-2 may receive the area ID from mobile node 106-1. In some implementations, provided that the same RAN technology is used in regions 902 and 904, mobiles node 106-1 may use the same virtual addressing scheme through the network as virtual addresses are used in the Virtual Router Redundancy Protocol (VRRP) or the Hot Standby Routing Protocol (HSRP).

A new mobility binding may be sent to update an AMRR (block 806). When mobile node 106-1 registers with LER 108-2, LER 108-2 may create a new mobility binding based on a new mobility label and the area ID received from mobile node 106-1 (e.g., an area ID associated with the previous area in which mobile node is located). In addition, LER 108-2 may send an area ID of the area that includes region 118-2 to mobile node 106-1, and may send the new mobility binding to update AMRR 114-1.

The mobility binding may be propagated from the AMRR to peer AMRRs (block 808). Upon receiving the mobility binding, AMRR 114-1 may compare the area ID of the mobility binding to the last recorded area ID of mobile node 106-1. If the area ID in the mobility binding and the last recorded area ID are the same, AMRR 114-1 may determine that AMRR 114-1 already has an LRL that pertains to mobile node 106-1. Otherwise, AMRR 114-1 may send a request for the LRL to other AMRRs. Because mobile node 106-1 moves within area 122-1, the area ID of the mobility binding and the last recorded area ID of mobile node 106-1 may be the same, and AMRR 114-1 may conclude that AMRR 114-1 already has the LRL. In addition, AMRR 114-1 may reflect the new mobility binding to its peers, which may include ALER 112-1 and LER 108-1, to install an LSP 908 in hierarchical MLBN 104.

A FIB record may be updated (block 810). As a result of AMRR 114-1 reflecting the new mobility binding, ALER 112-1 may exchange, within its mobility bindings and FIB record 404, the router ID associated with a terminating point of LSP 120-1 (e.g., router ID of LER 108-1) with a router ID associated with a terminating point of LSP 908 (e.g., the router ID of LER 108-2), as shown in FIG. 9. For example, ALER 112-1 may replace the value of Origin Router ID field 408 with the router ID of LER 108-2. In addition ALER 112-1 may update In Top Label field 410, Current Mobility Label field 414, Out Top Label field 416, and Out Interface ID field 418. ALER 112-1 may not perform an external update upon receiving the new mobility binding, as the Local Mobility Label has already been assigned by ALER 112-1.

A packet may be received at a second LER (block 812). For example, mobile node 106-2 may send packets to LER 108-3 via L2 grooming network 110-3. The packet may be routed to a first ALER over a first LSP (block 814). For example, LER 108-2 may relay the packet to ALER 112-2 over LSP 120-3.

The packet may be routed to a second ALER over a second LSP (block 816). For example, ALER 112-2 may relay the packet from LER 108-2 to ALER 112-1 over LSP 120-2.

The packet may be routed to the first LER over a third LSP (block 818). When ALER 112-1 receives the packet from ALER 112-2, ALER 112-1 may pop the outer label (e.g., the label associated with ALER 112-1). Furthermore, ALER 112-1 may read the mobility label of the packet, and locate FIB record 404 whose Local Mobility Label field 412 value matches the packet's mobility label. Once FIB record 404 is found, ALER 112-1 may replace the packet's mobility label with the value of Current Mobility Label field 414 of FIB record 404. ALER 112-1 may push the value of Out Top Label field 416 onto the label stack of the packet, and send the packet to LER 108-2.

The packet may be received at the first LER (block 820). When LER 108-2 receives the packet, LER 108-2 may forward the packet to mobile node 106-1.

In process 800, to maintain traffic continuity between mobile node 106-1 and mobile node 106-2 while the mobility binding for mobile node 106-1 is being updated in different devices, packets may be delivered over LSP 120-1. When ALER 112-1 is updated with the mobility binding (e.g., update Current Mobility Label field 414, In Top Label field 410, Origin Router ID field 408, Out Top Label field 416, etc. of FIB record 404), packets may be delivered over LSP 908 instead of LSP 120-1. In a different implementation, for the traffic continuity, packets directed to mobile node 106-1 may be replicated at ALER 112-1 and sent over both LSP 908 and LSP 120-1 until one of LSPs no longer carries any packets from mobile node 106-1.

Figure 10A:
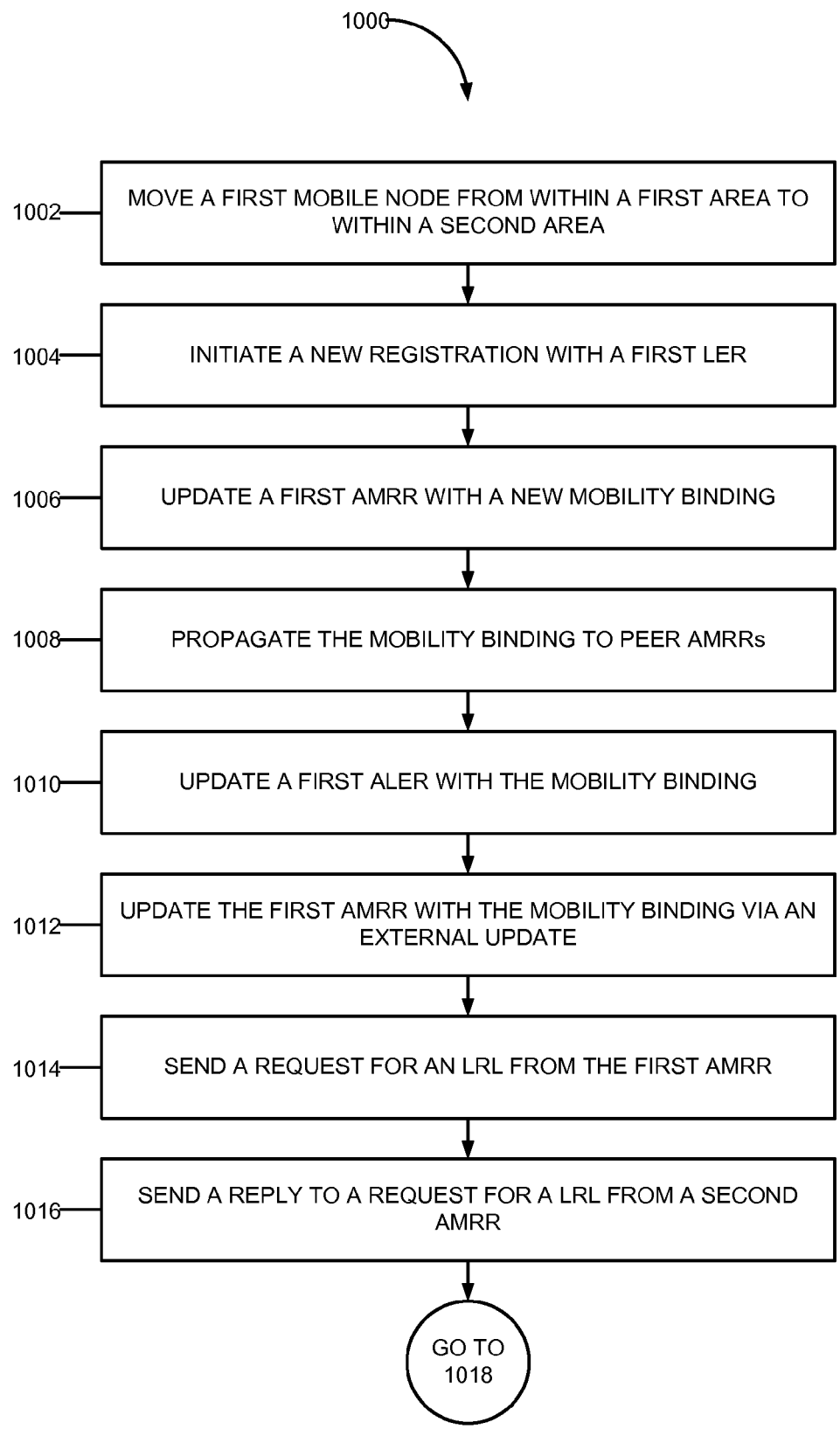
FIGS. 10A and 10B are flow diagrams of an exemplary process for updating the LSP of FIG. 1 when the mobile node of FIG. 1 moves from within an area to within another area.
Figure 10B:
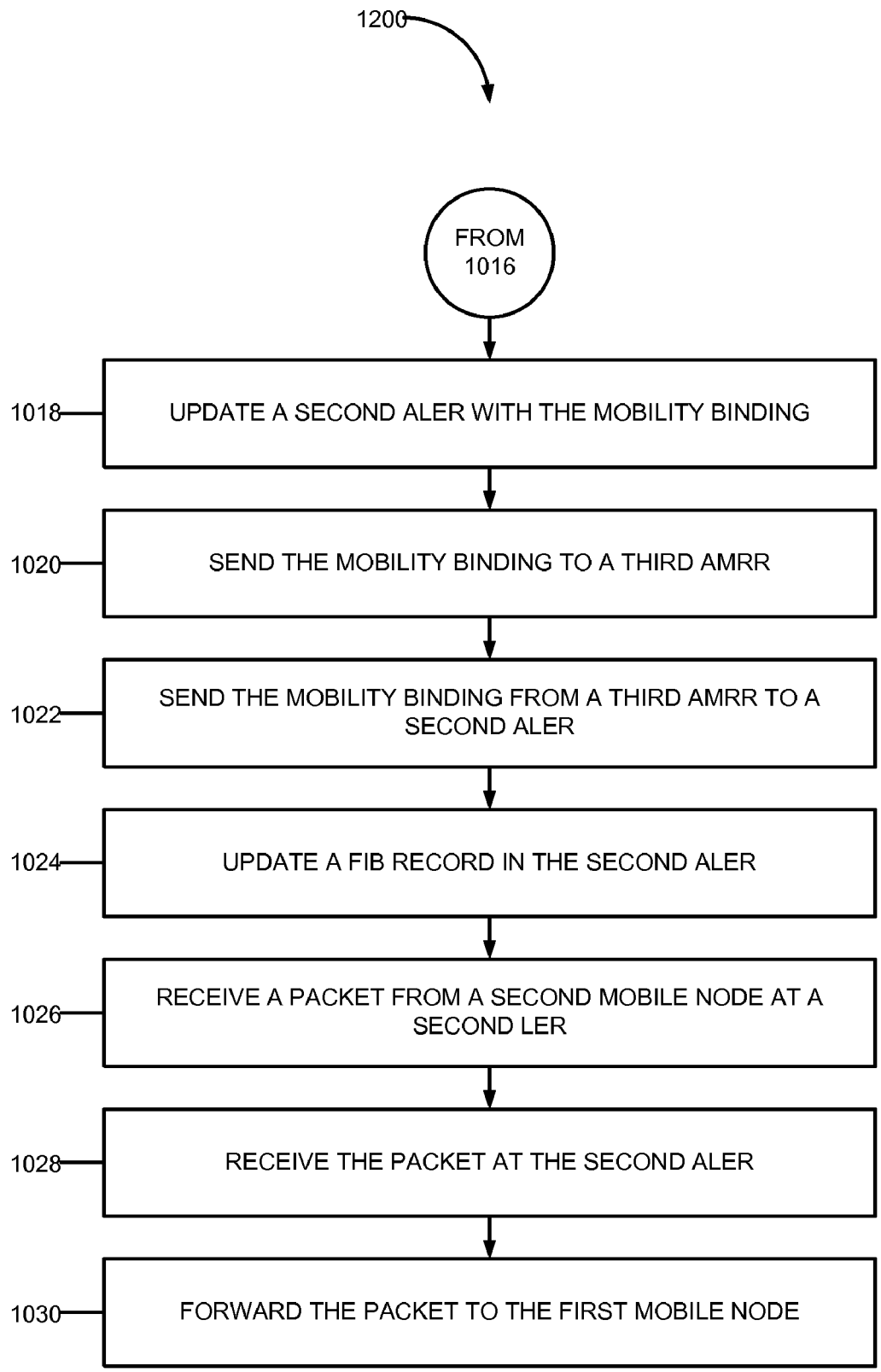

FIGS. 10A and 10B show flow diagrams of an exemplary process 1000 for updating LSP 120 when mobile node 106-1 moves from within area 122-1 to within another area. Assume that mobile node 106-1 is communicating with mobile node 106-2.

Figure 11:
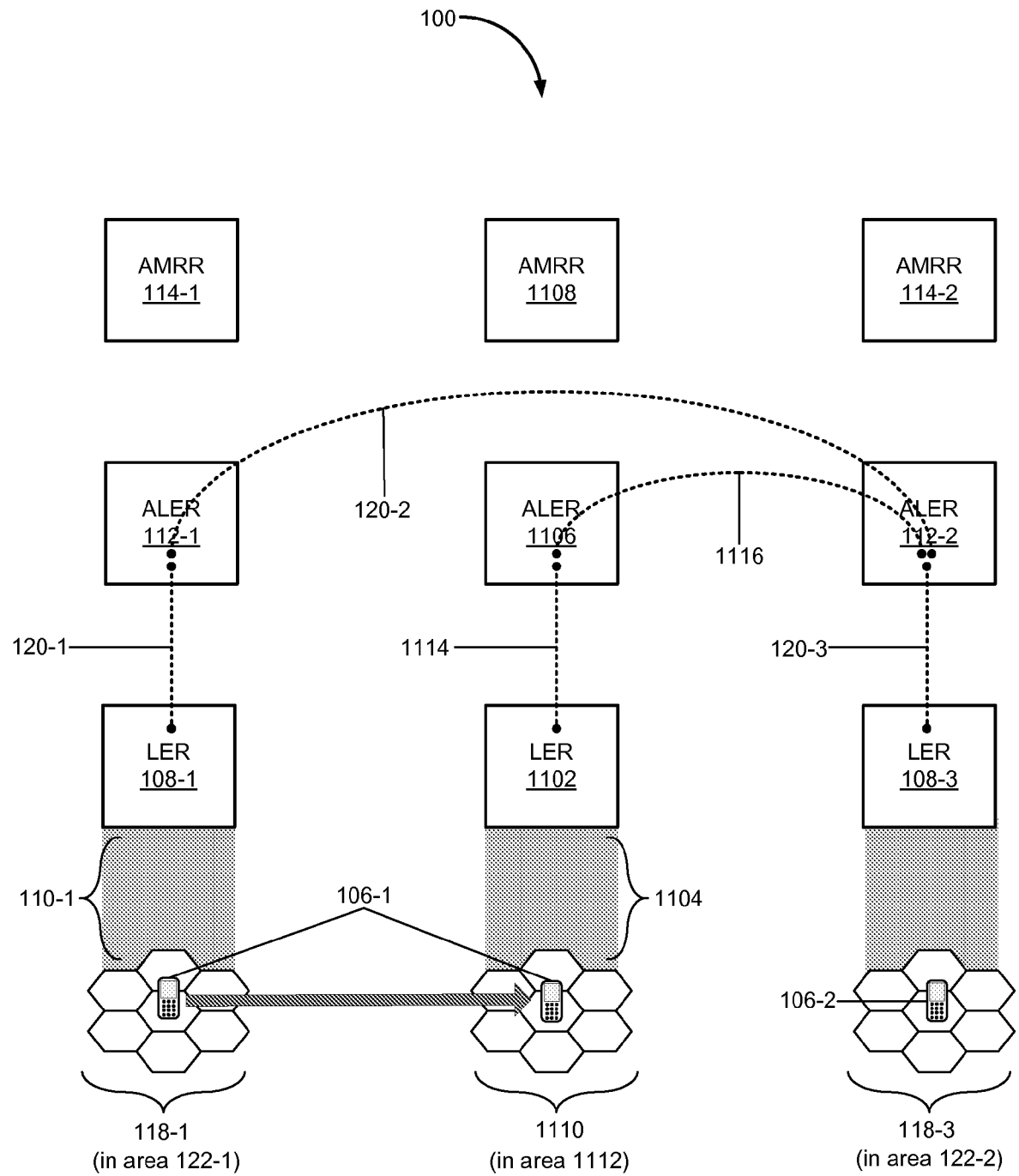
FIG. 11 illustrates the mobile node of FIG. 1 moving from within the area to within the other area.

Process 1000 may begin with moving a first mobile node from within a first area to within a second area (block 1002). As shown in FIG. 11, mobile node 106-1 may move from within area 122-1 to within an area 1112. In addition to some of the devices that are illustrated in FIG. 1, network 100 (shown in FIG. 11) may include LER 1102, L2 grooming network 1104, ALER 1106, and AMRR 1108. LER 1102, L2 grooming network 1104, ALER 1106, and AMRR 1108 may be arranged similarly as the devices for area 122-1 (or area 122-2) in FIG. 1, and may operate similarly as the devices. A number of elements that are shown in FIG. 1 are omitted from FIG. 11 for purposes of simplicity.

Returning to FIG. 10A, a new registration may be initiated with a first LER (block 1004). For example, as shown in FIG. 11, upon arriving in region 1110 within area 1112, mobile node 106-1 may discover LER 1102 and may register itself with MSF logic 306 in LER 1102. During the registration, LER 1102 may receive an area ID of area 122-1 (e.g., an area in which mobile node 106-1 has been located prior to moving within area 1112) from mobile node 106-1, and the area ID of area 1112 to mobile node 106-1.

A first AMRR may be updated with a new mobility binding (block 1006). When mobile node 106-1 registers with LER 1102, LER 1102 may create a new mobility binding based on a new mobility label for mobile node 106-1 and the area ID received from mobile node 106-1. LER 1102 may update AMRR 1108 with the new mobility binding.

The mobility binding may be propagated to peer AMRRs (block 1008). Upon receiving the mobility binding, AMRR 1108 may compare the area ID of the mobility binding to the last recorded area ID of mobile node 106-1 and/or to its own area ID if a record for mobile node 106-1 does not exist. If the area ID in the mobility binding and the compared area ID are different, AMRR 1108 may decide to send a request for a LRL to other AMRRs. In process 1000, because mobile node 106-1 moves from within area 122-1 to within area 1112, the area ID of the mobility binding and the compared area ID of mobile node 106-1 may be different, and AMRR 1108 may decide to send the request for a LRL to AMRR 114-1. In addition AMRR 1108 may replace the area ID in the mobility binding with its own area ID.

A first ALER may be updated with the mobility binding (block 1010). For example, as shown in FIG. 11, AMRR 1108 may update ALER 1106 with the mobility binding, via an internal update. ALER 1106 may assign a Local Mobility Label and create FIB record 404 based on the mobility binding.

The first AMRR may be updated with the mobility binding, via an external update (block 1012). As shown in FIG. 11, to update AMRR 1108, ALER 1106 may provide an external update message that includes mobile node 106-1's IP address, the Local Mobility Label that is assigned by ALER 1106 at block 1010, and ALER 1106's router ID.

A request for the LRL may be sent from the first AMRR (block 1014). For example, along with the request for the LRL, AMRR 1108 may send the mobility binding, which may include mobile node 106-1's IP address, the Local Mobility Label assigned by ALER 1106, ALER 1108's router ID, and the area ID of area 1110.

A reply to the request for a LRL may be sent from a second AMRR (block 1016). In response to AMRR 1108's request for the LRL, AMRR 114-1 may send a reply that may be received at AMRR 1108. The reply may include the LRL, which may include the area ID of area 122-2. AMRR 1108 may update its LRL based on the reply.

As shown in FIG. 10B, a second ALER may be updated with the mobility binding (block 1018). To update ALER 112-1, AMRR 114-1 may send an external update message that includes the mobility binding received from AMRR 1108. In response to the external update message, ALER 112-1 may update Origin Router ID field 408, In Top Label field 410, Current Mobility Label field 414, and Out Top Label field 416 of FIB record 404 in its own FIB 402. ALER 112-1 may not initiate an internal update based on the external update message, since a Local Mobility Label already exists for mobile node 106-1.

The mobility binding may be sent to a third AMRR (block 1020). AMRR 1108 may send the mobility binding for mobile node 106-1 to AMRR 114-2. The mobility binding may provide the Local Mobility Label assigned by ALER 1106 and the router ID that identifies an originating router from which the packet may arrive (e.g., the router terminates/starts LSP 1116).

The mobility binding may be sent from the third AMRR to a second ALER (block 1022). When AMRR 114-2 receives the mobility binding from AMRR 114-1, AMRR 114-2 may reflect the mobility binding to ALER 112-2.

A FIB record in the second ALER may be updated (block 1024). When ALER 112-2 receives the mobility binding from AMRR 114-2, ALER 112-2 may insert new values into Current Mobility Label field 414 and Origin Router ID field 408 in FIB record 404 with values taken from the mobility binding. In addition, ALER 112-2 may update the values of label fields in FIB record 404 (e.g., In Top Label field 410).

A packet from a second mobile node may be received at a second LER (block 1026). When LER 108-2 receives the packet, LER 108-3 may insert a label stack in the packet. The label stack may already have been constructed at LER 108-3 during a prior exchange of packets between mobile node 106-1 and mobile node 106-2.

The packet may be received at the second ALER (block 1028). When ALER 112-2 receives the packet from LER 108-3, ALER 112-2 may pop the top label and may look up FIB record 404 whose Local Mobility Label field 412 value matches the packet's mobility label. Upon retrieving FIB record 404, ALER 112-2 may swap the packet's mobility label with the value of Current Mobility Label field 414 in FIB record 404. In addition, ALER 112-2 may push the value of Out Top Label field 416 of FIB record 404 onto the label stack of the packet.

The packet may be forwarded to the first mobile node (block 1030). Once the label stack is set in the packet, ALER 112-2 may forward the packet to mobile node 106-1. The packet forwarding process may involve performing series of actions for forwarding the packet over LSPs 1116 and 1114.

In process 1000, traffic continuity between mobile node 106-1 and mobile node 106-2 may be maintained while the mobility binding is being updated in different devices. More specifically, after LSP 1114 is established but before LSP 1116 is set up, packets from mobile node 106-2 may be routed via LSP 120-2 to ALER 112-1. ALER 112-1, in turn, may re-route the packets to ALER 1106 via a temporary LSP (not shown in FIG. 11). Once LSP 1116 is established, the packets may be delivered to mobile node 106-1 via LSPs 120-3, 1116, and 1114.

FIGS. 6, 8, 10A, and 10B show or illustrate exemplary processes 600, 800, and 1000. Portions of processes 600, 800, and/or 1000 may involve managing area IDs. FIGS. 12A through 13B illustrate flow diagrams of exemplary processes for managing area IDs within one or more of processes 600, 800, and 1000.

Figure 12A:
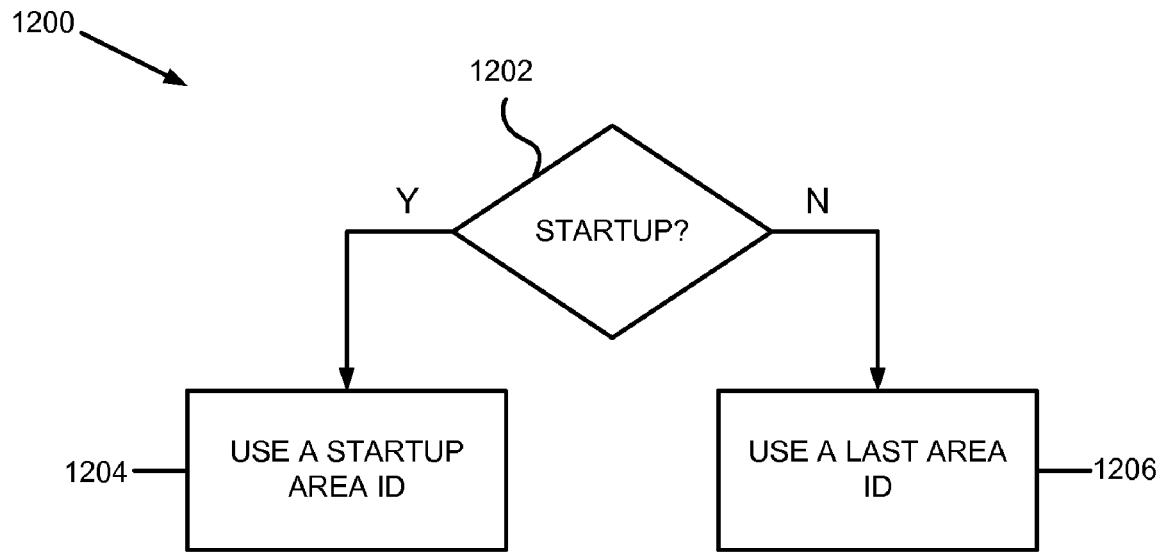
FIG. 12A is a flow diagram of an exemplary process for managing an area identifier (ID) in the mobile node of FIG. 1.

FIG. 12A is a flow diagram of a process 1200 for managing an area ID at mobile node 106-x. Process 1200 may begin with a determination of whether mobile node 106-x is at a startup state (block 1202).

If mobile node 106-x is at the startup state (block 1202—YES), mobile node 106-x may use a startup area ID (block 1204). The startup area ID may include a pre-determined ID that mobile node 106-1 may communicate to LER 108-x upon its startup. The startup area ID may not include the ID of an area within which mobile node 106-x is located or any other area ID used in the hierarchical MLBN.

If mobile node 106-x is not at the startup state (block 1202—NO), mobile node 106-x may use the area ID of the last visited area (block 1206). That is, in interacting with LER 108-x, mobile node 106-x may provide the area ID of the last visited area to LER 108-x.

Figure 12B:
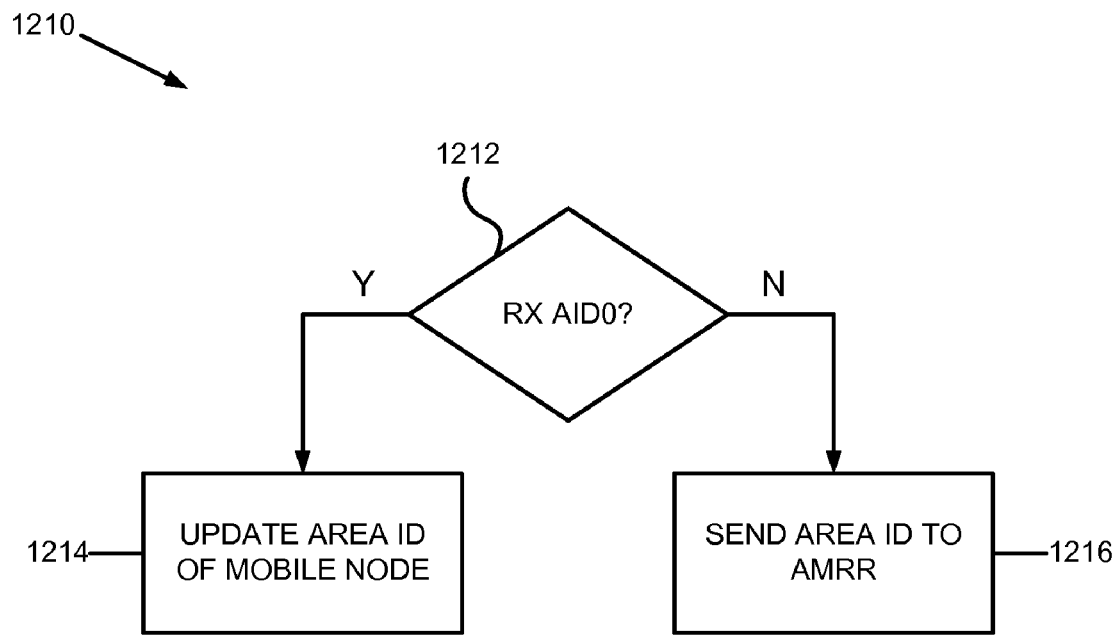
FIG. 12B is a flow diagram of an exemplary process for managing an area ID in the LER of FIG. 1.

FIG. 12B is a flow diagram of a process 1210 for managing an area ID at LER 108-x. Process 1210 may begin with a determination, at LER 108-x, of whether an area ID received from mobile node 106-x is the startup area ID (block 1212). If the received area ID is the startup area ID (block 1212—YES), an area ID may be updated at mobile node 106-x (block 1214). LER 108-x may send, to mobile node 106-x, the area ID of the area in which a region associated with LER 108-x is located. Mobile node 106-x may update the area ID in mobile node 106-x's memory, and may use the area ID in subsequent communication with LER 108-x.

If the received area ID is not the startup area ID (block 1212—NO), the area ID may be sent from LER 108-x to AMRR 114-x (block 1216). For example, LER 108-x may send the area ID to AMRR 114-x during an internal update.

Figure 13A:
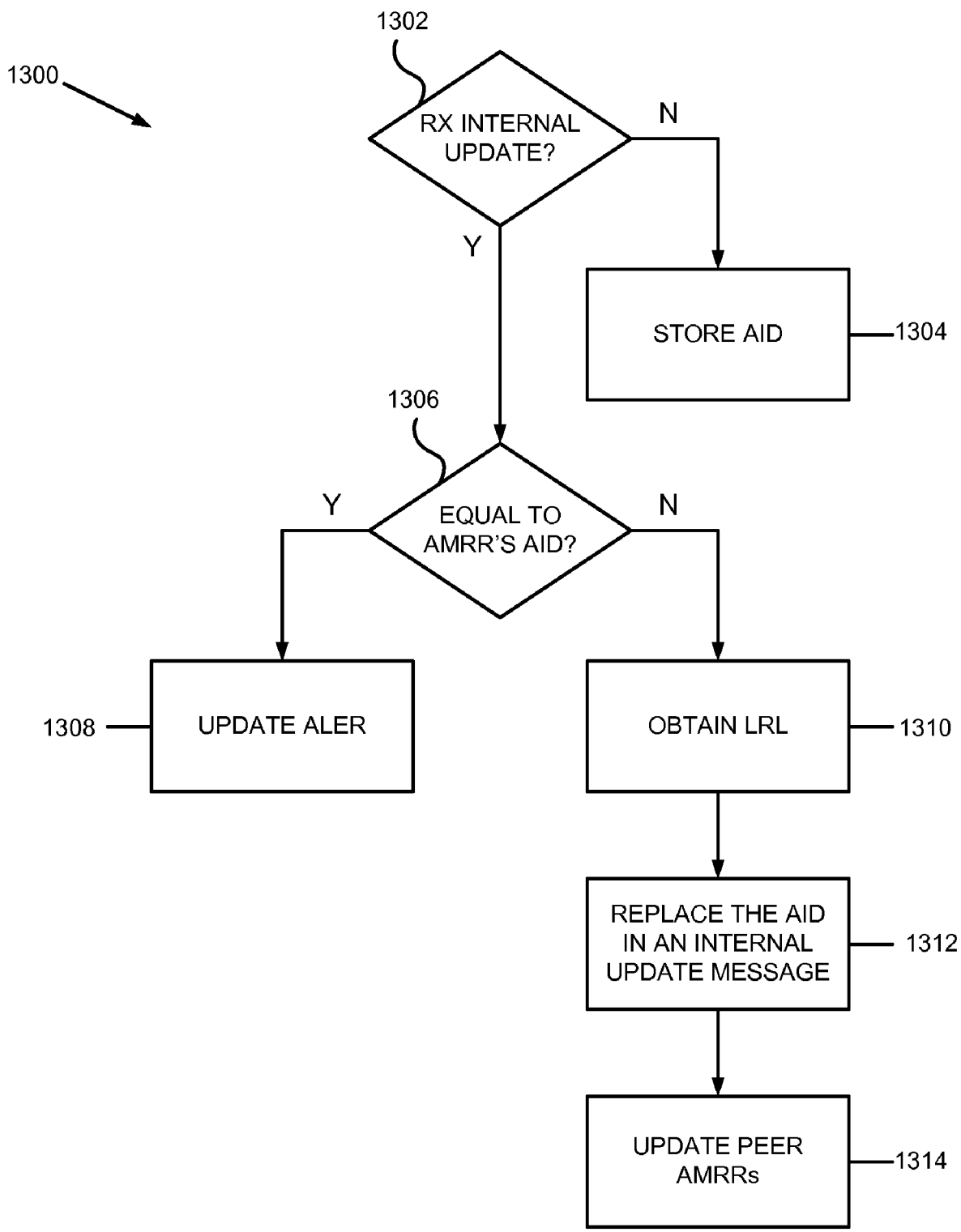
FIG. 13A is a flow diagram of an exemplary process for managing an area ID in an exemplary area mobility route reflector (AMRR) of FIG. 1.

FIG. 13A is a flow diagram of a process 1300 for managing an area ID at AMRR 114-x. Process 1300 may begin with a determination of whether an area ID is received in an internal update message (block 1302). If the area ID is received in an external update message (block 1302—NO), the area ID may be stored as part of records related to mobility bindings (block 1304). If the area ID is received in an internal message (block 1302—YES), it may be determined whether the received area ID is equal to the area ID of AMRR 114-x (block 1306).

If the area ID is equal to the area ID of AMRR 114-x (block 1306—YES), AMRR 114-x may update ALER 112-x with the received mobility binding (block 1308). Otherwise (block 1306—NO), a LRL may be obtained at AMRR 114-x (block 1310). To obtain the LRL, AMRR 114-x may send a request for the LRL to an AMRR that is associated with the area ID in the received internal update message.

AMRR 114-x may replace the area ID in an internal update message with its own area ID and (block 1312). In addition, AMRR 114-x may send the internal update message to ALER 112-x. Peer AMRRs may be updated in accordance with the LRL (block 1314). When AMRR 114-x receives the LRL from the AMRR to which AMRR 114-x sends the request for the LRL, AMRR 114-x may send the mobility binding to update per AMRRs that correspond to the area IDs listed in the LRL.

Figure 13B:
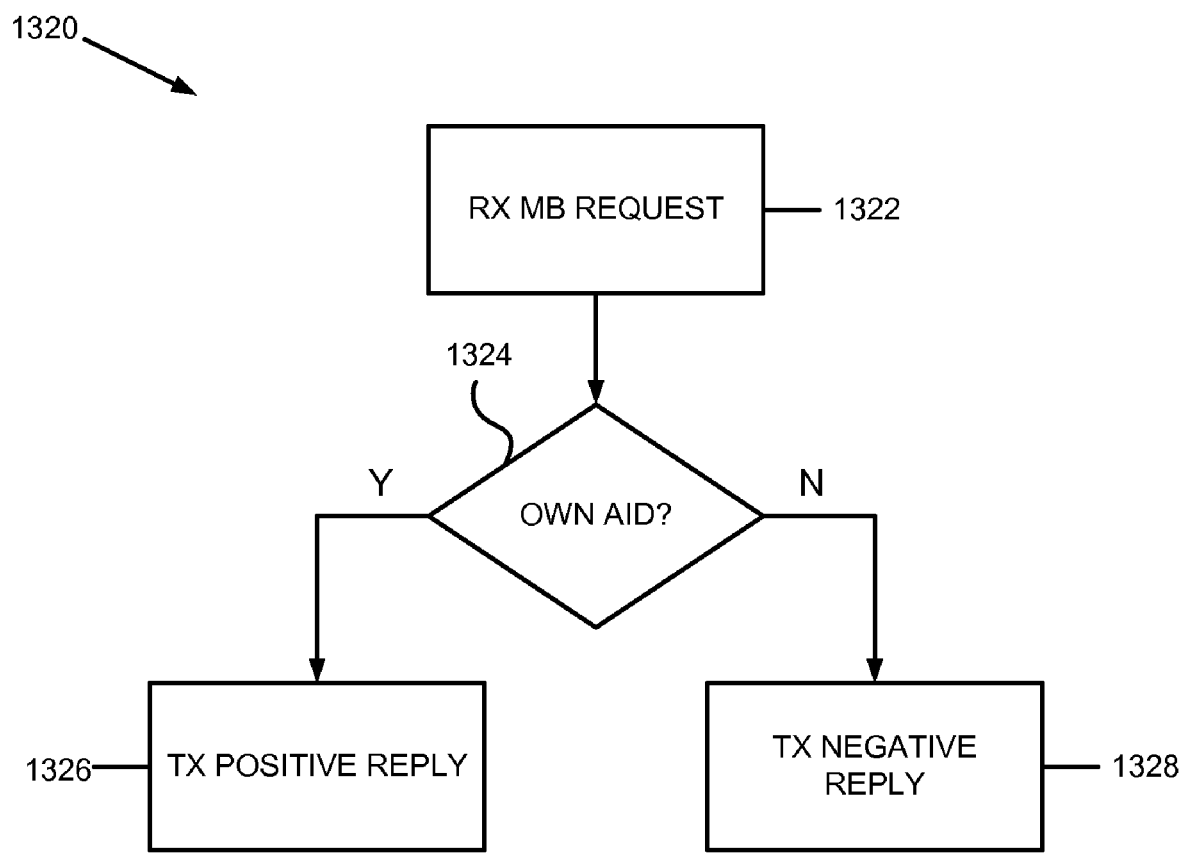
FIG. 13B is a flow diagram of another exemplary process for managing an area ID at the AMRR of FIG. 1.

FIG. 13B is a flow diagram of another process 1320 for managing an area ID at AMRR 114-x. Process 1320 may begin with a request for a mobility binding from a peer AMRR being received at AMRR 114-x (block 1322).

It may be determined if an area ID of the requested mobility binding is AMRR 114-x's own area ID (block 1324). When AMRR 114-x receives the request for the mobility binding, AMRR 114-x may compare the area ID of the requested mobility binding at AMRR 114-x to the area ID of AMRR 114-x. If the area IDs are equal (block 1324—YES), AMRR 114-x may transmit a positive reply (e.g., a reply with the mobility binding). Otherwise (block 1324—NO), a negative reply (e.g., a reply that does not include the mobility binding) may be sent to the peer AMRR (block 1328).

The above paragraphs describe exemplary processes that may be performed by one or more of devices in hierarchical MLBN 104 to establish, modify, remove, and/or use LSPs. The exemplary processes in hierarchical MLBN 104 may be scalable, as devices that are illustrated in FIGS. 1 and/or 11 may be able to distribute processing load over many devices. In part, such capability in hierarchical MLBN 104 may be attributable to AMRRs 114, each of which may act as a centralized control plane node covering an area. As described above, in acting as a control plane node, AMRR 114-x may reflect internal updates from LERs 108 to ALER 112-x, reflecting external updates from outside the mobility area to ALER 112-x, processing internal updates from ALER 112-x, and generating mobility bindings and LRL requests/replies.

The ability to distribute processing load may also be attributable to segmentation of LSPs. If there is a change in LSP 120-x, for example, due to a handoff, devices in hierarchical MLBN 104 may need to be updated with information only to the extent necessary to modify LSPs 120 that are affected by the change. For example, in FIG. 11, when mobile node 106-1 moves from region 118-1 to region 118-2, LSP 908 may replace LSP 120-1. LSPs 120-2 and 120-3 may not be affected, and the devices in hierarchical MLBN 104 may not be updated with unnecessary information (e.g., information that pertains to LSPs 120-2 and 120-3).

For each of LSPs 120 to be relatively independent of other LSPs 120, a packet that passes through LSP 120-x may carry a Local Mobility Label that is unaffected by allocation of mobility labels in other LSPs 120. That is, a Local Mobility Label may be scoped within a LSP segment (e.g., LSP 120-1, 120-2, etc.).

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to exemplary processes illustrated in FIGS. 6, 8, 10A, 10B, 12A, 12B, 13A and 13B, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

An Appendix that includes the document "Mobility Label Based Network: Hierarchical Mobility Management and Packet Forwarding Architecture" is additionally included hereto as a part of this specification.

What is claimed is:

1. A method comprising:

establishing a communication path between a mobile node and a first label edge router;

establishing a first label switched path between the first label edge router and a first area label edge router;

establishing a second label switched path between a second label edge router and a second area label edge router;

establishing a third label switched path between the first area label edge router and the second area label edge router;

establishing communication between the mobile node and a corresponding node over the first label switched path, the second label switched path, and the third label switched path; and maintaining the communication between the mobile node and the corresponding node when the mobile node moves from one physical location to another physical location, wherein the maintaining the communication includes:
performing a handoff when the mobile node moves from within a first cell in a first region to within a second cell in a second region, the first region and the second region being in an area covered by the first area label edge router, wherein the performing the handoff includes:
establishing a fourth label switched path between a third label edge router that covers the second region and the first area label edge router, the first area label edge router aggregating the first label edge router and the third label edge router, and wherein the establishing the fourth label switched path includes:
registering the mobile node at the third label edge router;
creating a new mobility binding for the mobile node at the third label edge router; and
updating the first area label edge router with the new mobility binding from the third label edge router via an internal update, wherein the registering includes creating, at the third label edge router, a new mobility binding that associates a mobility label and an area identifier (ID), the area ID including a number associated with a geographical area.

2. The method of claim 1, further comprising:

conveying packets from the first area label edge router to the mobile node over the first label switched path after registering the mobile node at the third label edge router and before updating the first area label edge router with the new mobility binding via the internal update.

updating the third area label edge router with a new mobility binding created at the third label edge router.

3. A method comprising:

establishing a communication path between a mobile node and a first label edge router;

establishing a first label switched path between the first label edge router and a first area label edge router;

establishing a second label switched path between a second label edge router and a second area label edge router;

establishing a third label switched path between the first area label edge router and the second area label edge router;

establishing communication between the mobile node and a corresponding node over the first label switched path, the second label switched path, and the third label switched path; and maintaining the communication between the mobile node and the corresponding node when the mobile node moves from one physical location to another physical location, wherein the maintaining the communication between the mobile node and the corresponding node includes performing a handoff when the mobile node moves from within a first area covered by the first area label edge router to within a second area covered by a third area label edge router, and wherein the performing the handoff includes:
registering the mobile node at a third label edge router;
establishing a fourth label switched path between the third label edge router and the third area label edge router; and
establishing a fifth label switched path between the third area label edge router and the second area label edge router;

establishing a temporary label switched path between the first area label edge router and the third area label edge router after establishing the fourth label switched path and before establishing the fifth label switched path; and routing packets from the corresponding node to the mobile node via the second label switched path, the third label switched path, the temporary label switched path, and the fourth label switched path until the fifth label switched path is established.

4. A method comprising:

establishing a communication path between a mobile node and a first label edge router;

establishing a first label switched path between the first label edge router and a first area label edge router;

establishing a second label switched path between a second label edge router and a second area label edge router;

establishing a third label switched path between the first area label edge router and the second area label edge router;

establishing communication between the mobile node and a corresponding node over the first label switched path, the second label switched path, and the third label switched path; and maintaining the communication between the mobile node and the corresponding node when the mobile node moves from one physical location to another physical location, wherein the maintaining the communication between the mobile node and the corresponding node includes performing a handoff when the mobile node moves from within a first area covered by the first area label edge router to within a second area covered by a third area label edge router, wherein the performing the handoff includes:
registering the mobile node at a third label edge router;
establishing a fourth label switched path between the third label edge router and the third area label edge router; and
establishing a fifth label switched path between the third area label edge router and the second area label edge router, and wherein the establishing the fifth label switched path includes:
sending a new mobility binding from the third area label edge router to a first route reflector;
obtaining a list of one or more route reflectors that are to be updated by the first route reflector; and
propagating the mobility binding from the first route reflector to the one or more route reflectors, each of the one or more route reflectors updating a corresponding area label edge router.

5. The method of claim 4, where obtaining a list of one or more route reflectors includes:
comparing, at the first route reflector, an area identifier associated with the first route reflector to an area identifier associated with the first area; and
sending, to a second route reflector whose area identifier is identical to the area identifier associated with the first area, a request for a last requestor list when the area identifier associated with the first route reflector is different from the area identifier associated with the first area, the last requestor list including a list of area identifiers associated with route reflectors that requested the mobility binding from the second route reflector.

6. A method comprising:
establishing a communication path between a mobile node and a first label edge router;
establishing a first label switched path between the first label edge router and a first area label edge router;
establishing a second label switched path between a second label edge router and a second area label edge router;
establishing a third label switched path between the first area label edge router and the second area label edge router;
establishing communication between the mobile node and a corresponding node over the first label switched path, the second label switched path, and the third label switched path; and
maintaining the communication between the mobile node and the corresponding node when the mobile node moves from one physical location to another physical location,
wherein the maintaining the communication between the mobile node and the corresponding node includes performing a handoff when the mobile node moves from within a first area covered by the first area label edge router to within a second area covered by a third area label edge router, and
wherein the performing the handoff includes:
registering the mobile node at a third label edge router;
establishing a fourth label switched path between the third label edge router and the third area label edge router; and
establishing a fifth label switched path between the third area label edge router and the second area label edge router;
receiving, at a first route reflector, a request for a mobility binding from a second route reflector; and
sending the mobility binding from the first route reflector to the second route reflector when the request includes an area identifier that is equivalent to an area identifier associated with the first route reflector.

* * * * *